United States Patent [19]

Satoh et al.

[11] Patent Number: 4,792,579

[45] Date of Patent: Dec. 20, 1988

[54] STABILIZED OXYMETHYLENE COPOLYMER COMPOSITION

[75] Inventors: Seinosuke Satoh, Kurashiki; Minoru Hamada, Narashino, both of Japan

[73] Assignee: Asahi Kasei Kogyo Kabushiki Kaisha, Osaka, Japan

[21] Appl. No.: 157,617

[22] Filed: Feb. 19, 1988

[51] Int. Cl.$^4$ .............................................. C08K 5/11
[52] U.S. Cl. .................................. 524/145; 524/148; 524/184; 524/301
[58] Field of Search ............... 524/593, 145, 148, 184, 524/301; 560/222, 263, 264

[56] References Cited

U.S. PATENT DOCUMENTS

| | | |
|---|---|---|
| 2,993,025 | 7/1961 | Alsup et al. |
| 3,484,399 | 12/1969 | Kakos, Jr. |
| 3,484,400 | 12/1969 | Halek ................... 524/593 |
| 3,488,303 | 1/1970 | Heinz ................... 524/593 |
| 3,960,984 | 6/1976 | Kohan . |
| 4,107,115 | 8/1978 | Foulks ................... 524/301 |
| 4,386,178 | 5/1983 | Schuette et al. |

FOREIGN PATENT DOCUMENTS

| | | |
|---|---|---|
| 43-14322 | 6/1968 | Japan . |
| 48-43371 | 12/1973 | Japan . |
| 54-32658 | 10/1979 | Japan . |
| 56-10939 | 3/1981 | Japan . |
| 57-15616 | 3/1982 | Japan . |
| 57-102943 | 6/1982 | Japan . |
| 57-111346 | 7/1982 | Japan . |
| 59-33353 | 2/1984 | Japan . |
| 59-213722 | 12/1984 | Japan . |
| 59-213752 | 12/1984 | Japan . |

*Primary Examiner*—Veronica P. Hoke
*Attorney, Agent, or Firm*—Birch, Stewart, Kolasch & Birch

[57] ABSTRACT

There is disclosed a stabilized oxymethylene copolymer composition comprising a blend of an oxymethylene copolymer and an alkaline earth metal salt of an ester of a tribasic inorganic acid of an organic carboxylic acid monoester of an alcohol having two or more hydroxyl groups, as the stabilizer.

19 Claims, No Drawings

STABILIZED OXYMETHYLENE COPOLYMER COMPOSITION

FIELD OF THE INVENTION AND RELATED ART STATEMENT

The invention relates to a novel stabilized oxymethylene copolymer composition. More particularly, the present invention relates to an oxymethylene copolymer composition which is superior to conventional oxymethylene copolymer compositions in long-term stability. In particular, the oxymethylene copolymer composition of the present invention is superior in long-term hot water resistance and long-term heat ageing characteristics and forms only a very small amount of a deposit on a mold at the time of molding.

RELATED ART DISCUSSION

Oxymethylene copolymers are plastics which are widely utilized as engineering resins in various fields because these plastics have excellent mechanical characteristics, moldability, etc.

However, unstabilized oxymethylene copolymers are insufficient in stability and hence are disadvantageous, for example, in that oxymethylene copolymer undergo depolymerization at the terminals or undergo severance of the main chain under a high temperature atmosphere or in hot water. Therefore, oxymethylene copolymers should usually be stabilized by various terminal treatments followed by the addition of additives such as antioxidants, thermostabilizers, etc.

Particularly when the oxymethylene copolymer is used as an engineering resin, it is indispensible to blend the copolymer with a thermal oxidation inhibitor for maintaining and improving the quality of the copolymer. Various stabilizers have heretofore been proposed.

For example, there have been proposed a stabilizer comprising a metal salt of an organic acid having 2 to 30 carbon atoms and containing at least one carboxyl group and no nitrogen, and at least one metal salt of an alcohol having 2 to 30 carbon atoms and containing no nitrogen (U.S. Pat. No. 3,484,399); and a stabilizer comprising at least one compound selected from the group consisting of hydroxides, inorganic acid salts and alkoxides of alkali metals or alkalineearth metals, nitrogen-containing polymeric compounds, and a hindered phenol (Japanese patent publication No. 56-10939).

It is known that an ester of boric acid of a glycerol monoester of a fatty acid is useful as an antistatic agent for oxymethylene copolymer (Japanese patent publication No. 57-15616), but this publication does not suggest that the boric acid ester is effective as a stabilizer.

As a method for suppressing the formation of a deposit on the surface of a mold (hereinafter referred to as MD) at the time of fabrication, there have been proposed, for example, a method using a polyamide (U.S. Pat. No. 2,993,025 and Japanese patent appln. Kokai (laid-open) No. 50-145458) and a method using a nitrogen compound such as an amide compound or a hydrazine compound (Japanese patent appln. Kokai (laid-open) Nos. 57-111346, 57-102943 and 59-33353).

However, an oxymethylene copolymer containing as additives the metal salt of a fatty acid and the metal salt of an aliphatic alcohol possesses improved the physical properties by virtue of the additives when evaluated in terms of long-term heat ageing characteristics and long-term hot water resistance, but is disadvantageous in that a test piece thereof undergoes marked browning. An oxymethylene copolymer containing as additives the hydroxide, inorganic acid salt or alkoxide of a metal, the nitrogen-containing polymeric compound and the hindered phenol possesses improved long-term heat ageing characteristics to some degree by virtue of the additives, but is disadvantageous not only in that spots were formed on a test piece thereof in the evaluation of the long-term hot water resistace but also in that the copolymer has a lowered mechanical strength. A polyacetal containing as additive the ester of boric acid of a glycerol monoester of a fattay acid which is an antistatic agent is excellent in antistatic properties but has neither improved long-term heat ageing characteristics nor improved long-term hot water resistance.

The polyamide reported to be effective against MD is undoubtedly effective as an agent for capturing formaldehyde and suppresses the formation of a deposit caused by formaldehyde. But since the polyamide itself tends to adhere to a mold, MD is formed owing to the adherence. The nitrogen compound such as an amide compound or a hydrazine compound adheres to a mold less firmly than the polyamide, but cannot suppress the formation of MD because these compounds are poor in ability to capture formaldehyde.

OBJECT AND SUMMARY OF THE INVENTION

Accordingly, the object of the present invention is to provide an oxymethylene copolymer which is free from the defects of the conventional oxymethylene copolymers, which isexcellent in long-term heat ageing characteristics and long-term hot water resistance as an engineering resin, and which causes the formation of only a very small amount of MD.

In order to develop a stabilizer which improves the long-term heat ageing characteristics and long-term hot water resistance of an oxymethylene copolymer and prevents the formation of MD without impairing the desirable physical properties of the copolymer, the present inventors have devoted themselves to research and have consequently found that this object can be achieved by the use of an alkaline earth metal salt of an ester of a tribasic inorganic acid of an organic carboxylic acid monoester of an alcohol having two or more hydroxyl groups. On the basis of this finding, the present invention has been accomplished.

That is to say, the present invention provides a stabilized oxymethylene copolymer composition comprising a blend of an oxymethylene copolymer and at least one compound, as a stabilizer, selected from the group consisting of alkaline earth metal salts of esters of tribasic inorganic acid of organic carboxylic acid monoesters of alcohols having two or more hydroxyl groups.

DETAILED DESCRIPTION OF THE INVENTION

The oxymethylene copolymer used in the composition of the present invention is a copolymer having a structure in which oxymethylene units represented by the general formula:

are bonded at random to oxyalkylene units represented by the general formula:

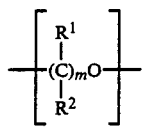

(II)

wherein $R^1$ and $R^2$, which may be the same or different, are individually a hydrogen atom, an alkyl group or an aryl group, and m is an integer of 2 to 6. Although the proportion of the oxyalkylene units is not critical as long as it is more than zero, the proportion preferably from 0.05 to 50 moles, more preferably from 0.1 to 20 moles per 100 moles of the oxymethylene units. The oxyalkylene unit includes, for example, an oxyethylene unit, an oxypropylene unit, an oxytetramethylene unit and an oxyphenylethylene unit. Of these oxyalkylene units the, oxyethylene unit $-[(CH_2)_2O]-$ and the oxytetramethylene unit $-[(CH_2)_4O]-$ are particularly preferred from the viewpoint of improving the physical properties of the oxymethylene copolymer.

The oxymethylene copolymer can be obtained by copolymerizing or reacting a formaldehyde, a trioxane or an oxymethylene homopolymer with a cyclic formal. The oxymethylene copolymer thus obtained is preferably subjected to a treatment for stabilizing the molecular terminals. As a method for the stabilizing treatment, there is usually employed, for example, a method of esterifying —OH at the terminal of the copolymer, or a method of hydrolyzing the copolymer until a relatively stable carbon-carbon bond is located at each terminal.

In the composition of the present invention, an alkaline earth metal salt of an ester of a tribasic inorganic acid of an organic carboxylic acid monoester of an alcohol having two or more hydroxyl groups (hereinafter referred to as "stabilizer G") is used as the stabilizer.

The alcohol having two or more hydroxyl groups in stabilizer G includes, for example, dihydric alcohols such as ethylene glycol, propylene glycol, 1,3-propanediol, 1,2-butanediol, 1,3-butenadiol, 1,4-butanediol, 1,6-hexanediol, 1,5-pentanediol, and the like; trihydric alcohols such as glycerol, trimethylolethane, trimethylolpropane, and the like; polyhydric alcohols such as pentanerythritol, sorbitan, sorbitol, mannitol, sucrose, and the like; phenyl- or phenoxy-substituted derivatives such as styrene glycol, phenylglycerol ether, and the like; and bisphenols such as bisphenol A and the like. Among them, polyhydric alcohols having three or more hydroxyl groups such as glycerol, trimethylolethane, trimethylolpropane, pentaerythritol, sorbitan, sorbitol, mannitol, sucrose, and the like are preferred, and glycerol and sorbitan are particularly preferred.

The organic carboxylic acid used in stabilizer G includes acetic acid, propionic acid, butyric acid, valeric acid, caproic acid, capric acid, lauric acid, myristic acid, palmitic acid, stearic acid, oleic acid, linoleic acid, behenic acid, etc. Among them, fatty acids having 8 to 22 carbon atoms such as capric acid, lauric acid, myristic acid, palmitic acid, stearic acid, oleic acid, linoleic acid, behenic acid, and the like are preferable, and lauric acid and stearic acid are even more preferable.

Preferable examples of the tribasic inorganic acid in stabilizer g inlude phosphoric acid, boric acid, etc. The alkaline earth metal in stabilizer G includes, for example, magnesium, calcium, barium, strontium, etc. Among these metals, magnesium, calcium and barium are preferred.

That is to say, stabilizer G includes magnesium salt of monoester of boric acid of ethylene glycol monolaurate, calcium salt of monoester of boric acid of 1,6-hexanediol monostearate, calcium salt of monoester of boric acid of glycerol monopropionate, calcium salt of monoester of boric acid of glycerol monostearate, magnesium salt of monoester of boric acid of glycerol monostearate, barium salt of monoester of boric acid of glycerol monostearate, calcium salt of monoester of boric acid of glycerol monolaurate, magnesium salt of monoester of boric acid of glycerol monolaurate, calcium salt of monoester of phosphoric acid of glycerol monostearate, magnesium salt of monoester of phosphoric acid of glycerol monostearate, calcium salt of monoester of phosphoric acid of glycerol monolaurate, magnesium salt of monoester of phosphoric acid of glycerol monolaurate, calcium salt of monoester of boric acid of glycerol monobehenate, calcium salt of monoester of boric acid of sorbitan monostearate, magnesium salt of monoester of boric acid of sorbitan monostearate, barium salt of monoester of boric acid of sorbitan monostearate, calcium salt of monoester of boric acid of sorbitan monolaurate, magnesium salt of monoester of boric acid of sorbitan monolaurate, barium salt of monoester of boric acid of sorbitan monolaurate, calcium salt of monoester of phosphoric monoester of sorbitan monolaurate, barium salt of monoester of phosphoric acid of sorbitan monolaurate, etc.

The chemical structure of the stabilizer G has not yet been identified, however, a possible structure thereof could be shown as follows, taking calcium salt of monoester of boric acid of glycerol monostearate as an illustrative example:

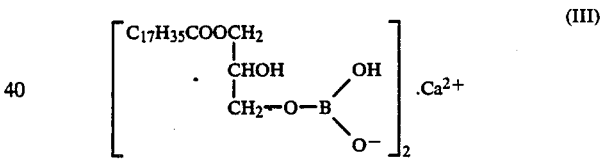

(III)

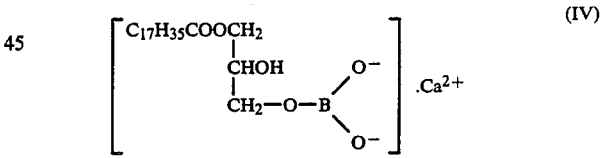

(IV)

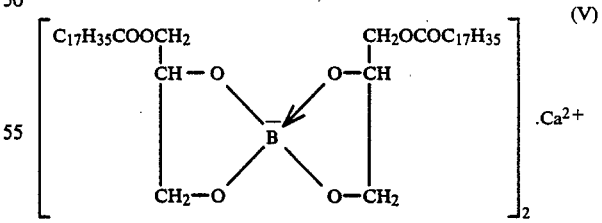

(V)

Although it is not critical, a method of producing stabilizer G includes, for example, a method comprising mixing an organic carboxylic acid monoester of an alcohol having two or more hydroxyl groups with a tribasic inorganic acid, heating the resulting mixture to remove the condensation water, dissolving the compound thus obtained in a suitable solvent, and neutralizing the resulting solution with hydroxide of an alkaline earth metal to obtain the desired compound, and a method comprising mixing an organic carboxylic acid monoester of an alcohol having two or more hydroxyl groups with an alkaline earth metal salt of a tribasic inorganic acid, and heating the resulting mixture to carry out the condensation (Japanese patent publication Nos. 43-14322 and 48-43371).

Either a single stabilizer G or a combination of two or more stabilizers G may be used.

The blending amount of stabilizer G in the composition of the present invention is selected usually in the range of 0.01 to 5% by weight, preferably 0.03 to 1% by weight, more preferably 0.05 to 0.5% by weight. When the blending amount is less than 0.01% by weight, the improving effect on the long-term heat ageing characteristics and the long-term hot water resistance is not sufficient nor is the suppressing effect on the formation of the MD sufficient. When the blending amount exceeds 5% by weight, the formation of silver streaks or coloring, as a result of residing in a cylinder of a molding machine, tends to occur at the time of the injection molding. This occurrence is not desirable.

Antioxidants which are conventionally used in oxymethylene copolymer compositions can be further included in the compositions of the present invention. As the antioxidants, hindered phenols, hindered amines, etc. can be used. Specifically, there can be used phenols such as 2,2'-methylene-bis(4-methyl-6-t-butylphenol), triethylene glycol-bis[3-(3-t-butyl-5-methyl-4-hydroxyphenyl)propionate], pentaerythrityl-tetrakis[3-(3,5-di-t-butyl-4-hydroxyphenyl)propionate], 1,6-hexanediol-bis[3-(3,5-di-t-butyl-4-hydroxyphenyl)propionate], distearyl-3,5-di-butyl-4-hydroxybenzyl phosphonate, and the like; and amines such as 3,5-di-t-butyl-4-hydroxyphenyl-3,5-distearyl-thiotriazylamine, N-phenyl-N'-isopropyl-p-phenylenediamine, N,N'-diphenyl-p-phenylenediamine, 4,4'-bis(4-α,α-dimethylbenzyl)diphenylamine, N,N'-di-β-naphthyl-p-phenylenediamine, and the like. Of these antioxidants, 2,2'-methylene-bis(4-methyl-6-t-butylphenol), triethylene glycol-bis[3-(3-t-butyl-5-methyl-4-hydroxyphenyl)propionate], and pentaerythrityl-tetrakis[3-(3,5-di-t-butyl-4-hydroxyphenyl)propionate] are particularly effective.

Further, the composition of the present invention can be incorporated with at least one nitrogen-containing compound selected from the group consisting of a polyamide a triazine deviative and a dicyandiamide.

As the polyamides, there can be used high molecular weight compounds having in the molecular chain a linkage represented by the formula:

wherein R is a hydrogen atom or an alkyl group. Specifically, there can be used, for example, polymers formed from lactams such as caprolactam, laurolactam and the like; polymers obtained by the reaction of dicarboxylic acids such as adipic acid, sebacic acid, dodecanoic diacid, linolic acid dimer and the like with diamines such as ethylenediamine, tetramethylenediamine, hexamethylenediamine, metaxylylenediamine and the like; poly-β-alanine (Japanese patent appln. Kokai (laid-open) Nos. 59-213722 and 59-213752); and copolymers of these polymers. More specifically, there can be used nylons 6, 12, 46, 66, 610 and 612, poly(xylyleneadipamido), etc. These polyamides may be used alone or in combination of two or more.

As the triazine derivatives, there can be used melamine, acetoguanamine, acryloguanamine, etc. These triazine derivatives may be used alone or in combinations of two or more.

Of these nitrogen-containing compounds, the polyamides are preferred.

The blending amount of the nitrogen-containing compounds is usually in the range of 0.01 to 5% by weight, preferably 0.01 to 1% by weight, more preferably 0.05 to 0.5% by weight.

In producing the composition of the present invention, the order in which stabilizer G, the antioxidant and the nitrogen-containing compound are added, is not critical. The forms of these components are also not critical and may be a powder, a liquid or a solution form.

If desired, the composition of the present invention can be incorporated with other additives which are conventionally included in oxymethylene compositions. For example, these additives may be antistatic agents, lubricants, inorganic fillers and reinforcing materials such as glass fiber, glass beads, carbon fiber, etc., and pigments.

By virtue of the addition of stabilizer G to an oxymethylene copolymer, the oxymethylene copolymer composition of the present invention not only shows a marked improvement tensile strength retention; tensile elongation retention, and weight retention both in a 140° C. long-term heat ageing characteristics test and a 120° C. long-term hot water resistance test, but also undergoes a much smaller change in the appearance of the test molded products in these two tests, as compared with conventional oxymethylene copolymer compositions. Furthermore, when subjected to continuous molding, the oxymethylene copolymer composition of the present invention forms much less MD and is excellent in the appearance of the molded product, as compared with conventional oxymethylene copolymer compositions.

It is reasoned that the improvement in the retention of the physical properties in such long-term characteristics tests is that the alkaline earth metal salt contained in stabilizer G acts effectively as an acceptor for formic acid generated by the thermal decomposition of the oxymethylene copolymer. Furthermore, it is reasoned that the improvement in the retention of the physical properties and coloring as a result of residing in the molding apparatus is attributable also to the fact that stabilizer G hardly catalyzes formose formation, unlike hydroxides and oxides of alkali metals and alkaline earth metals, which are catalyzed for formose formation. It is conjectured that the reason the only a small amount of MD is formed in continuous molding as described above is that stabilizer G inhibits the adherence of formaldehyde gas to the surface of a mold. Moreover, the formation of MD is suppressed synergistically by the inclusion of the nitrogen-containing compound.

Because of these advantages, the oxymethylene copolymer composition of the present invention can withstand employment in a severe environment. For example, the employment of the composition at high temperatures or in hot water for a long period of time, would only result in the formation of a small amount of MD even in continuous molding for a long period of time. This can contribute greatly to an improvement of the productivity.

EXAMPLES

The present invention is further illustrated in more detail with reference with the following examples.

Characteristics of compositions in Examples and Comparative Examples are evaluated as follows:

(1) Long-term hot water resistance test

A 120° C. long-term hot water resistance test is carried out by means of an autoclave having a pressure regulating valve. Deionized water is used as test water. A temperature control unit and a flowmeter are set, and the test is carried out by a 120° C. flowing water method.

The individual retention ratios of tensile strength (according to ASTM D-638), tensile elongation (according to ASTM D-638) and weight of molded products (measured in 10 mg unit) are calculated based on the following equations:

$$\text{Tensile strength retention ratio} = (TS/TS_o) \times 100$$

$$\text{Tensile elongation retention ratio} = (TE/TE_o) \times 100$$

$$\text{Weight retention ratio} = (W/W_o) \times 100$$

TS: Tensile strength after testing
$TS_o$: Tensile strength before testing
TE: Tensile elongation after testing
$TE_o$: Tensile strength before testing
W: Weight of molded product after testing
$W_o$: Weight of molded product before testing The appearance change of molded products is evaluated as shown in the following (2).

(2) Appearance change of molded product

The change of the appearance of an early molded product and a molded product after testing is observed with the naked eye and rated as follows:

o: A slight color change is observed with the naked eye.
Δ: Yellowing is clearly observed with the naked eye, or spots are observed at places on the surface of a molded product.
x: Browning is observed, or spots are observed all over the surface of a molded product.

(3) Long-term hot ageing characteristic test

A 140° C. long-term hot ageing characteristic test is carried out in a Gear oven (Model GPS-222, mfd. by TABAI ESPEC, Co., Ltd.; exhaust duct: 20° opened). The evaluation items and method are the same as in the long-term hot water resistance test.

(4) Evaluation by a continuous molding test

| | |
|---|---|
| Injection molding machine: | JSW N70A (mfd. by THE JAPAN STEEL WORKS, Ltd.) |
| Cylinder temperature: | 200° C. |
| Injection pressure: | 40 kg/cm²G |
| Injection time: | 5 sec, cooling 5 sec. |
| Mold temperature: | 90° C. and 30° C. |

Continuous molding into JIS No. 3 tensile specimens is conducted 5,000 shots under the above molding conditions, after which the state of a deposit on a mold is observed with the naked eye and rated as follows:

0: No mold deposit is observed.
1: Substantially no mold deposit is observed.
2: A thin mold deposit is observed.
3: An obvious mold deposit is observed.
4: A thick mold deposit adhered to the whole surface of a mold.

(5) Appearance change of a molded product after resistance in an injection molding machine After residence in an injection molding machine (Type Allrounder 221-55-250, mfd. by ARBURG) for 1 hour at a material temperature of 230° C., molding into test pieces having about 3×12×120 mm size is conducted, and the degree of the formation of silver streaks on the surface of the molded product is observed and rated as follows:

o: Neither silver streaks nor yellowing is observed on the surface of the molded product.
Δ: Silver streaks are observed at places on the surface of the molded product, or yellowing of the molded article is observed.
x: Silver streaks are observed all over the surface of the molded product, or obvious and strong yellowing of the molded product is observed.

Production of an oxymethylene copolymer

Using boron trifluoride-butyl ether complex as a catalyst, 98% by weight of trioxane and 2% by weight of ethylene oxide are polymerized to obtain a crude oxymethylene copolymer. The reaction is stopped by addition of triethylamine, and the polymer is separated. Then, a mixture of triethylamine and water is added to the polymer, and the terminal unstable portions of the polymer are removed in a vented extruder of 65φ. MI of the polymer after the stabilization of the terminals is 9.5 (g/10 min.). This polymer is named B-1.

In the same manner as described above, 97% by weight of trioxane and 3% by weight of 1,3-dioxepane are polymerized and a terminally stabilized oxymethylene copolymer [MI 9.0 (g/10 min.)] is prepared. This polymer is named B-2.

Examples 1 to 36 and Comparative Examples 1 to 11

According to each recipe shown in Tables 1 to 4, the ingredients listed therein are homogeneously mixed in a Henschel mixer. The resulting mixture is passed through an extruder of 50φ to be melted and stabilized, and a resin is taken out through a die heat in the form of a strand. The strand is immediately pelletized, dried, and then subjected to various evaluation checks. The results obtained are shown in Tables 1 to 4.

The symbols in the tables show the following compounds:

Stabilizers G:
G-1: calcium salt of monoester of boric acid of glycerol monostearate
G-2: magnesium salt of monoester of boric acid of glycerol monostearate
G-3: calcium salt of monoester of boric acid of glycerol monolaurate
G-4: calcium salt of monoester of phosphoric acid of glycerol monostearate
G-5: magnesium salt of monoester of phosphoric acid of glycerol monolaurate
G-6: barium salt of monoester of boric acid of glycerol monostearate
G-7: calcium salt of monoester of boric acid of sorbitan monostearate
G-8: calcium salt of monoester of phosphoric acid of sorbitan monostearate G-9: barium salt of monoester of boric acid of sorbitan monolaurate G-10: calcium salt of monoester of boric acid of glycerol monopropionate G-11: magnesium salt of monoester of boric acid of ethylene glycol monolaurate G-12: calcium salt of monoester of boric acid of 1,6-hexanediol monostearate G-13: calcium salt of monoester of boric acid of glycerol monobehenate Antioxidants:

A-1: triethylene glycol-bis[3-(3-t-butyl-5-methyl-4-hydroxyphenyl)propionate] (trade name: Inganox 245, mfd. by Ciga-Geigy Co.)

A-2: pentaerythrityl-tetrakis[3-(3,5-di-t-butyl-4-hydroxyphenyl)propionate] (trade name: Inganox 1010, mfd. by Ciba Geigy Co.)

A-3: 2,2'-methylene-bis(4-methyl-6-t-butylphenol) (trade name: Yoshinox 2246, mfd. by Yoshitomi Pharmaceutical Industries)

Nitrogen-containing compounds:

C-1: nylon 66

C-2: nylon 6/66/610 (40%/30%/30%)

C-3: poly-$\beta$-alanine

C-4: melamine

C-5: dicyandiamide

Other additives:

D-1: monoester of boric acid of glycerol monostearate

D-2: calcium stearate

D-3: calcium ricinolate

D-4: calcium hydroxide

D-5: sodium salt of monoester of boric acid of glycerol monostearate

TABLE 1

| Example | stabilizer G | Blending amount | Antioxidant | Blending amount | Nitrogen-containing compound | Blending amount | Oxymethylene copolymer |
|---|---|---|---|---|---|---|---|
| 1 | G-1 | 0.2 | A-1 | 0.5 | — | — | B-1 |
| 2 | G-1 | 0.05 | A-1 | 0.5 | — | — | B-1 |
| 3 | G-1 | 0.01 | A-1 | 0.5 | — | — | B-1 |
| 4 | G-1 | 0.1 | A-1 | 0.5 | — | — | B-1 |
| 5 | G-1 | 5.0 | A-1 | 0.5 | — | — | B-1 |
| 6 | G-1 | 0.2 | A-2 | 0.5 | — | — | B-1 |
| 7 | G-1 | 0.2 | A-3 | 0.5 | — | — | B-1 |
| 8 | G-2 | 0.2 | A-1 | 0.5 | — | — | B-1 |
| 9 | G-3 | 0.2 | A-1 | 0.5 | — | — | B-1 |
| 10 | G-4 | 0.1 | A-1 | 0.5 | — | — | B-1 |
| 11 | G-5 | 0.1 | A-1 | 0.5 | — | — | B-1 |
| 12 | G-6 | 0.2 | A-1 | 0.5 | — | — | B-1 |
| 13 | G-7 | 0.3 | A-1 | 0.5 | — | — | B-1 |
| 14 | G-8 | 0.2 | A-1 | 0.5 | — | — | B-1 |
| 15 | G-9 | 0.2 | A-1 | 0.5 | — | — | B-1 |
| 16 | G-10 | 0.2 | A-1 | 0.5 | — | — | B-1 |

| Example | 120° C. long-term hot water resistance 3000 hrs. Appearance | 500 hrs. Tensile strength retention (%) | 500 hrs. Tensile elongation retention (%) | 500 hrs. Weight retention (%) | Appearance | 1000 hrs. Tensile strength retention (%) | 1000 hrs. Tensile elongation retention (%) | 1000 hrs. Weight retention (%) | Appearance | 1500 hrs. Tensile strength retention (%) | 1500 hrs. Tensile elongation retention (%) | 1500 hrs. Weight retention (%) | Appearance | 3000 hrs. Tensile strength retention (%) | 3000 hrs. Tensile elongation retention (%) | 3000 hrs. Weight retention (%) |
|---|---|---|---|---|---|---|---|---|---|---|---|---|---|---|---|---|
| 1 | o | 100 | 100 | 100 | o | 100 | 100 | 100 | o | 100 | 100 | 100 | o | 98 | 82 | 99 |
| 2 | o | 100 | 100 | 100 | o | 100 | 100 | 99 | o | 100 | 100 | 99 | o | 90 | 37 | 97 |
| 3 | Δ | 100 | 100 | 100 | o | 100 | 100 | 99 | o | 100 | 80 | 99 | o | 75 | 17 | 94 |
| 4 | o | 100 | 100 | 100 | o | 100 | 100 | 100 | o | 100 | 100 | 99 | o | 98 | 80 | 99 |
| 5 | Δ | 100 | 100 | 100 | o | 100 | 100 | 99 | o | 100 | 100 | 100 | o | 97 | 75 | 98 |
| 6 | o | 100 | 100 | 100 | o | 100 | 100 | 100 | o | 100 | 100 | 99 | o | 98 | 78 | 98 |
| 7 | o | 100 | 100 | 100 | o | 100 | 100 | 99 | o | 100 | 100 | 99 | o | 88 | 33 | 99 |
| 8 | o | 100 | 100 | 100 | o | 100 | 100 | 100 | o | 100 | 100 | 100 | o | 98 | 80 | 95 |
| 9 | Δ | 100 | 100 | 100 | o | 100 | 100 | 99 | o | 100 | 100 | 100 | o | 95 | 74 | 98 |
| 10 | Δ | 100 | 100 | 100 | o | 100 | 100 | 99 | o | 100 | 100 | 99 | Δ | 86 | 34 | 94 |
| 11 | o | 100 | 100 | 100 | o | 100 | 100 | 99 | o | 100 | 100 | 99 | o | 88 | 35 | 96 |
| 12 | Δ | 100 | 100 | 100 | o | 100 | 100 | 99 | o | 100 | 100 | 99 | Δ | 96 | 61 | 97 |
| 13 | o | 100 | 100 | 100 | o | 100 | 100 | 99 | o | 100 | 100 | 99 | o | 85 | 33 | 97 |
| 14 | Δ | 100 | 100 | 100 | o | 100 | 100 | 99 | o | 100 | 90 | 99 | Δ | 72 | 15 | 93 |
| 15 | o | 100 | 100 | 100 | o | 100 | 100 | 99 | o | 100 | 100 | 99 | o | 86 | 40 | 97 |
| 16 | o | 100 | 100 | 100 | o | 100 | 100 | 99 | o | 100 | 100 | 99 | o | 90 | 41 | 95 |

| Example | 140° C. long-term heat ageing characteristic test 500 hrs. Tensile strength retention (%) | 500 hrs. Tensile elongation retention (%) | 500 hrs. Weight retention (%) | 1000 hrs. Tensile strength retention (%) | 1000 hrs. Tensile elongation retention (%) | 1000 hrs. Weight retention (%) | 2000 hrs. Tensile strength retention (%) | 2000 hrs. Tensile elongation retention (%) | 2000 hrs. Weight retention (%) | Continuous molding test High temperature mold (90° C.) | Continuous molding test Low temperature mold (30° C.) | Appearance of a molded product after residence in a molding machine 230° C. × 1 hr. |
|---|---|---|---|---|---|---|---|---|---|---|---|---|
| 1 | 100 | 100 | 99 | 100 | 100 | 98 | 98 | 63 | 98 | o | 2 | o |
| 2 | 100 | 100 | 99 | 100 | 98 | 95 | 84 | 31 | 95 | o | 2 | o |
| 3 | 100 | 100 | 98 | 100 | 60 | 95 | 75 | 19 | 95 | o | 2 | Δ |
| 4 | 100 | 100 | 99 | 100 | 100 | 99 | 99 | 68 | 99 | o | 2 | o |
| 5 | 100 | 100 | 99 | 100 | 100 | 99 | 93 | 42 | 98 | o | 2 | Δ |
| 6 | 100 | 100 | 99 | 100 | 100 | 99 | 99 | 80 | 99 | o | 2 | o |
| 7 | 100 | 100 | 99 | 100 | 98 | 98 | 83 | 27 | 95 | o | 2 | o |
| 8 | 100 | 100 | 99 | 100 | 100 | 99 | 98 | 68 | 98 | o | 2 | o |
| 9 | 100 | 100 | 99 | 100 | 100 | 99 | 88 | 53 | 97 | o | 2 | Δ |
| 10 | 100 | 100 | 99 | 100 | 100 | 99 | 98 | 30 | 96 | o | 2 | Δ |
| 11 | 100 | 100 | 99 | 100 | 98 | 99 | 88 | 26 | 97 | o | 2 | o |
| 12 | 100 | 100 | 99 | 100 | 99 | 99 | 85 | 53 | 96 | o | 2 | Δ |
| 13 | 100 | 100 | 99 | 100 | 98 | 99 | 95 | 35 | 95 | o | 2 | o |
| 14 | 100 | 100 | 99 | 100 | 97 | 99 | 83 | 12 | 93 | o | 2 | Δ |
| 15 | 100 | 100 | 99 | 100 | 97 | 99 | 70 | 32 | 95 | o | 2 | o |
| 16 | 100 | 100 | 99 | 100 | 95 | 99 | 86 | 30 | 96 | o | 2 | o |

TABLE 2

| Example | Stabilizer G | Blending amount | Antioxidant | Blending amount | Nitrogen-containing compound | Blending amount | Oxymethylene copolymer | 120° C. long-term hot water resistance 500 hrs. Tensile strength retention (%) | 500 hrs. Tensile elongation retention (%) | 500 hrs. Weight retention (%) | 500 hrs. Appearance | 1500 hrs. Tensile strength retention (%) | 1500 hrs. Tensile elongation retention (%) | 1500 hrs. Weight retention (%) | 1500 hrs. Appearance | 3000 hrs. Tensile strength retention (%) | 3000 hrs. Tensile elongation retention (%) |
|---|---|---|---|---|---|---|---|---|---|---|---|---|---|---|---|---|---|
| 17 | G-11 | 0.1 | A-1 | 0.5 | — | — | B-1 | 100 | 100 | 100 | o | 100 | 88 | 99 | o | 71 | 16 |
| 18 | G-11 | 0.2 | A-1 | 0.5 | — | — | B-1 | 100 | 100 | 100 | o | 100 | 85 | 99 | o | 74 | 15 |
| 19 | G-13 | 0.2 | A-1 | 0.5 | — | — | B-1 | 100 | 100 | 100 | o | 100 | 100 | 99 | o | 94 | 55 |
| 20 | G-1 | 0.2 | A-1 | 0.5 | — | — | B-2 | 100 | 100 | 100 | o | 100 | 100 | 99 | o | 96 | 75 |
| 21 | G-1 | 0.2 | A-1 | 0.5 | C-1 | 0.1 | B-1 | 100 | 100 | 100 | o | 100 | 100 | 99 | o | 96 | 75 |
| 22 | G-1 | 0.2 | A-1 | 0.5 | C-2 | 0.1 | B-1 | 100 | 100 | 100 | o | 100 | 100 | 99 | o | 97 | 78 |
| 23 | G-1 | 0.2 | A-1 | 0.5 | C-3 | 0.1 | B-1 | 100 | 100 | 100 | o | 100 | 100 | 99 | o | 95 | 55 |
| 24 | G-1 | 0.2 | A-1 | 0.5 | C-4 | 0.1 | B-1 | 100 | 100 | 100 | o | 100 | 100 | 99 | o | 94 | 49 |
| 25 | G-1 | 0.2 | A-1 | 0.5 | C-5 | 0.1 | B-1 | 100 | 100 | 100 | o | 100 | 100 | 99 | o | 94 | 40 |
| 26 | G-1 | 0.2 | A-1 | 0.5 | C-1 | 0.01 | B-1 | 100 | 100 | 100 | o | 100 | 83 | 99 | o | 88 | 32 |
| 27 | G-1 | 0.01 | A-1 | 0.5 | C-1 | 0.1 | B-1 | 100 | 100 | 100 | o | 100 | 100 | 99 | o | 96 | 79 |
| 28 | G-1 | 5.0 | A-1 | 0.5 | C-1 | 3.0 | B-1 | 100 | 100 | 100 | o | 100 | 100 | 99 | o | 97 | 77 |
| 29 | G-1 | 0.2 | A-1 | 0.5 | C-1 | 0.1 | B-1 | 100 | 100 | 100 | o | 100 | 100 | 99 | △ | 95 | 59 |
| 30 | G-1 | 0.2 | A-2 | 0.5 | C-1 | 0.1 | B-1 | 100 | 100 | 100 | o | 100 | 100 | 99 | o | 95 | 80 |
| 31 | G-1 | 0.2 | A-3 | 0.5 | C-1 | 0.1 | B-1 | 100 | 100 | 100 | o | 100 | 100 | 99 | o | 93 | 62 |
| 32 | G-2 | 0.2 | A-1 | 0.5 | C-1 | 0.1 | B-1 | 100 | 100 | 100 | o | 100 | 100 | 99 | o | 97 | 80 |

| Example | 120° C. long-term hot water resistance 3000 hrs. Weight retention (%) | 3000 hrs. Appearance | 140° C. long-term heat ageing characteristic test 500 hrs. Tensile strength retention (%) | 500 hrs. Tensile elongation retention (%) | 500 hrs. Weight retention (%) | 500 hrs. Appearance | 1000 hrs. Tensile strength retention (%) | 1000 hrs. Tensile elongation retention (%) | 1000 hrs. Weight retention (%) | 2000 hrs. Tensile strength retention (%) | 2000 hrs. Tensile elongation retention (%) | 2000 hrs. Weight retention (%) | Continuous molding test High temperature mold (90° C.) | Continuous molding test Low temperature mold (30° C.) | Appearance of a molded product after residence in a molding machine 230° C. × 1 hr. |
|---|---|---|---|---|---|---|---|---|---|---|---|---|---|---|---|
| 17 | 93 | o | 100 | 100 | 100 | o | 100 | 90 | 99 | 73 | 72 | 93 | 0 | 2 | o |
| 18 | 93 | o | 100 | 100 | 100 | o | 100 | 89 | 99 | 75 | 74 | 93 | 0 | 2 | o |
| 19 | 96 | o | 100 | 100 | 100 | o | 100 | 100 | 99 | 87 | 31 | 96 | 0 | 2 | o |
| 20 | 98 | o | 100 | 100 | 100 | o | 100 | 100 | 99 | 96 | 43 | 98 | 0 | 2 | o |
| 21 | 98 | o | 100 | 100 | 100 | o | 100 | 100 | 99 | 97 | 60 | 98 | 1 | 0 | o |
| 22 | 98 | o | 100 | 100 | 100 | o | 100 | 96 | 99 | 95 | 62 | 98 | 0 | 0 | o |
| 23 | 98 | o | 100 | 100 | 100 | o | 100 | 98 | 99 | 92 | 58 | 97 | 0 | 1 | o |
| 24 | 97 | o | 100 | 100 | 100 | o | 100 | 64 | 99 | 91 | 43 | 96 | 1 | 1 | o |
| 25 | 96 | o | 100 | 100 | 100 | o | 100 | 100 | 99 | 80 | 39 | 94 | 0 | 0 | △ |
| 26 | 97 | △ | 100 | 100 | 100 | o | 100 | 99 | 99 | 92 | 33 | 98 | 1 | 1 | o |
| 27 | 98 | o | 100 | 100 | 100 | △ | 100 | 100 | 99 | 95 | 40 | 98 | 1 | 0 | △ |
| 28 | 99 | △ | 100 | 100 | 100 | △ | 100 | 99 | 99 | 93 | 70 | 96 | 0 | 1 | △ |
| 29 | 97 | o | 100 | 100 | 100 | o | 100 | 100 | 99 | 94 | 51 | 98 | 2 | 0 | o |
| 30 | 98 | o | 100 | 100 | 100 | o | 100 | 99 | 99 | 95 | 66 | 98 | 0 | 1 | △ |
| 31 | 98 | o | 100 | 100 | 100 | o | 100 | 100 | 99 | 94 | 57 | 98 | 0 | 0 | o |
| 32 | 97 | o | 100 | 100 | 100 | o | 100 | 100 | 99 | 96 | 70 | 97 | 0 | 0 | o |

TABLE 3

| Example | stabilizer G | Blending amount | Antioxidant | Blending amount | Nitrogen containing compound | Blending amount | Oxymethylene copolymer | 120° C. long-term hot water resistance 500 hrs. Tensile strength retention (%) | Tensile elongation retention (%) | Weight retention (%) | Appearance | 1500 hrs. Tensile strength retention (%) |
|---|---|---|---|---|---|---|---|---|---|---|---|---|
| 33 | G-3 | 0.2 | A-1 | 0.5 | C-1 | 0.1 | B-1 | 100 | 100 | 100 | o | 100 |
| 34 | G-4 | 0.2 | A-1 | 0.5 | C-1 | 0.1 | B-1 | 100 | 100 | 100 | o | 100 |
| 35 | G-1 | 0.2 | A-1 | 0.5 | C-1 | 0.1 | B-1 | 100 | 100 | 100 | o | 100 |
| 36 | G-1 | 0.2 | A-1 | 0.5 | C-1 | 0.1 | B-2 | 100 | 100 | 100 | o | 100 |

| Example | 120° C. long-term hot water resistance 1500 hrs. Tensile elongation retention (%) | Weight retention (%) | Appearance | 3000 hrs. Tensile strength retention (%) | Tensile elongation retention (%) | Weight retention (%) | Appearance | 140° C. long-term heat ageing characteristic test 500 hrs. Tensile strength retention (%) | Tensile elongation retention (%) | Weight retention (%) | Appearance |
|---|---|---|---|---|---|---|---|---|---|---|---|
| 33 | 100 | 99 | o | 96 | 66 | 97 | o | 100 | 100 | 100 | o |
| 34 | 100 | 99 | Δ | 82 | 31 | 94 | Δ | 100 | 100 | 100 | o |
| 35 | 100 | 99 | o | 82 | 29 | 94 | o | 100 | 100 | 100 | o |
| 36 | 100 | 99 | o | 95 | 77 | 98 | o | 100 | 100 | 100 | o |

| Example | 140° C. long-term heat ageing characteristic test 1000 hrs. Tensile strength retention (%) | Tensile elongation retention (%) | Weight retention (%) | Appearance | 2000 hrs. Tensile strength retention (%) | Tensile elongation retention (%) | Weight retention (%) | Appearance | Continuous molding test High temperature mold (90° C.) | Low temperature mold (30° C.) | Appearance of a molded product after residence in a molding machine 230° C. × 1 hr. |
|---|---|---|---|---|---|---|---|---|---|---|---|
| 33 | 100 | 99 | 99 | o | 95 | 64 | 97 | o | 0 | 0 | o |
| 34 | 100 | 100 | 99 | o | 87 | 28 | 96 | Δ | 1 | 1 | Δ |
| 35 | 100 | 99 | 99 | o | 80 | 33 | 95 | o | 0 | 0 | o |
| 36 | 100 | 99 | 99 | o | 95 | 48 | 98 | o | 0 | 0 | o |

TABLE 4

| Example | stabilizer G | Blending amount | Antioxidant | Blending amount | Nitrogen containing compound | Blending amount | Oxymethylene copolymer | 120° C. long-term hot water resistance 500 hrs. Tensile strength retention (%) | Tensile elongation retention (%) | Weight retention (%) | Appearance | 1500 hrs. Tensile strength retention (%) |
|---|---|---|---|---|---|---|---|---|---|---|---|---|
| 1 | — | — | A-1 | 0.5 | C-1 | 0.5 | B-1 | 100 | 52 | 99 | o | 30 |
| 2 | — | — | A-1 | 0.5 | C-2 | 0.5 | B-1 | 100 | 44 | 99 | o | 25 |
| 3 | — | — | A-1 | 0.5 | C-4 | 0.2 | B-1 | 100 | 85 | 100 | o | 85 |
| 4 | — | — | A-1 | 0.5 | C-5 | 0.1 | B-1 | 100 | 81 | 99 | o | 89 |
| 5 | — | — | A-3 | 0.3 | C-2 | 0.6 | B-1 | 100 | 40 | 99 | o | 13 |
| 6 | D-1 | 0.2 | A-1 | 0.5 | — | — | B-1 | 75 | 17 | 87 | o | 8 |
| 7 | D-2 | 0.1 | A-3 | 0.5 | — | — | B-1 | 100 | 100 | 100 | Δ | 100 |
| 8 | D-3 | 0.1 | A-3 | 0.5 | — | — | B-1 | 100 | 100 | 100 | Δ | 100 |
| 9 | D-4 | 0.1 | A-1 | 0.5 | C-1 | 0.1 | B-1 | 62 | 15 | 84 | Δ | 35 |
| 10 | D-1 | 0.2 | A-1 | 0.5 | C-1 | 0.1 | B-1 | 100 | 69 | 99 | o | 12 |
| 11 | D-5 | 0.2 | A-1 | 0.5 | C-2 | 0.6 | B-1 | Extrusion was impossible because of foaming and no pellet could be obtained. | | | | |

| Example | 120° C. long-term hot water resistance 1500 hrs. Tensile elongation retention (%) | Weight retention (%) | Appearance | 3000 hrs. Tensile strength retention (%) | Tensile elongation retention (%) | Weight retention (%) | Appearance | 140° C. long-term heat ageing characteristic test 500 hrs. Tensile strength retention (%) | Tensile elongation retention (%) | Weight retention (%) | Appearance |
|---|---|---|---|---|---|---|---|---|---|---|---|
| 1 | 11 | 78 | Δ | * | * | 8 | x | 100 | 55 | 99 | o |
| 2 | 10 | 82 | Δ | * | * | 10 | x | 100 | 50 | 99 | o |
| 3 | 29 | 96 | o | 20 | 10 | 80 | Δ | 100 | 92 | 100 | o |
| 4 | 37 | 94 | o | 18 | 7 | 73 | Δ | 100 | 53 | 99 | o |
| 5 | 8 | 80 | Δ | * | * | 4 | x | 100 | 35 | 99 | o |
| 6 | 8 | 75 | x | * | * | 4 | x | 93 | 29 | 97 | o |
| 7 | 100 | 99 | x | 92 | 63 | 97 | x | 100 | 100 | 100 | Δ |
| 8 | 100 | 98 | x | 90 | 46 | 97 | x | 100 | 100 | 100 | Δ |
| 9 | 10 | 80 | x | * | * | 0 | * | 100 | 100 | 99 | Δ |
| 10 | 10 | 78 | Δ | * | * | 5 | x | 100 | 44 | 99 | o |
| 11 | Extrusion was impossible because of foaming and no pellet could be obtained. | | | | | | | | | | |

TABLE 4-continued

| Example | strength retention (%) | elongation retention (%) | retention (%) | Appearance | strength retention (%) | elongation retention (%) | retention (%) | Appearance | perature mold (90° C.) | perature mold (30° C.) | a molding machine 230° C. × 1 hr. |
|---|---|---|---|---|---|---|---|---|---|---|---|
| 1 | 94 | 38 | 95 | Δ | 83 | 25 | 93 | Δ | 3 | 2 | Δ |
| 2 | 91 | 39 | 95 | Δ | 80 | 25 | 93 | Δ | 4 | 2 | Δ |
| 3 | 100 | 40 | 99 | o | 85 | 31 | 89 | Δ | 3 | 3 | x |
| 4 | 88 | 30 | 93 | Δ | 70 | 18 | 88 | Δ | 3 | 3 | x |
| 5 | 86 | 32 | 96 | Δ | 74 | 22 | 88 | Δ | 4 | 2 | x |
| 6 | 78 | 16 | 88 | Δ | 38 | 8 | 79 | x | 3 | 3 | x |
| 7 | 100 | 99 | 99 | Δ | 98 | 75 | 98 | x | 2 | 3 | x |
| 8 | 100 | 92 | 99 | Δ | 91 | 49 | 98 | x | 2 | 3 | x |
| 9 | 98 | 34 | 98 | x | 70 | 12 | 86 | x | 3 | 2 | x |
| 10 | 92 | 30 | 96 | Δ | 71 | 15 | 86 | Δ | 2 | 1 | o |
| 11 | | | | | | | | | | | |

Remarks *: unmeasurable

What is claimed is:

1. A stabilized moldable oxymethylene copolymer composition having improved long-term hot water resistance and long-term heat aging characteristics comprising a blend of an oxymethylene copolymer and an alkaline earth metal salt of an ester of a tribasic inorganic acid of an organic carboxylic acid monoester of an alcohol having two or more hydroxyl groups, as a stabilizer.

2. The composition according to claim 1, wherein the alcohol is a polyhydric alcohol having three or more hydroxyl groups.

3. The composition according to claim 2, wherein the alcohol is glycerol or sorbitan.

4. The composition according to claim 1, wherein the organic carboxylic acid of the organic carboxylic acid monoester is a fatty acid having 8 to 22 carbon atoms.

5. The composition according to claim 4, wherein the organic carboxylic acid of the organic carboxylic acid monoester is lauric acid or stearic acid.

6. The composition according to claim 1, wherein the inorganic acid of the ester of tribasic inorganic acid is boric acid or phosphoric acid.

7. The composition according to claim 1, wherein the alkaline earth metal salt is a salt of magnesium, calcium or barium.

8. The composition according to claim 1, wherein the content of the stabilizer is 0.01 to 5% by weight.

9. The composition according to claim 1, which comprises at least one nitrogen-containing compound selected from the group consisting of a polyamide, a triazine derivative and a dicyandiamide.

10. The composition according to claim 9, wherein the nitrogen-containing compound is a polyamide.

11. The composition according to claim 9, wherein the content of the nitrogen-containing compound is 0.1 to 5% by weight.

12. The composition according to claim 1, wherein the oxymethylene copolymer comprises oxymethylene units represented by the general formula:

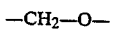  (I)

bonded at random to oxyalkylene units represented by the general formula:

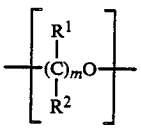  (II)

wherein $R^1$ and $R^2$, which may be the same or different, are individually a hydrogen atom, an alkyl group or an aryl group, and m is an integer of 2 to 6.

13. The composition according to claim 12, wherein the oxyalkylene units are represented by the formulae:

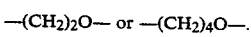

14. The composition according to claim 12, wherein the oxymethylene copolymer comprises from 0.05 to 50 moles of the oxyalkylene units per 100 moles of the oxymethylene units.

15. The composition according to claim 12, wherein the oxymethylene copolymer comprises from 0.1 to 20 moles of the oxyalkylene units per 100 moles of the oxymethylene units.

16. The composition according to claim 1, wherein the content of the stabilizer is 0.03 to 1.0% by weight.

17. The composition according to claim 1, wherein the content of the stabilizer is 0.05 to 0.5% by weight.

18. The composition according to claim 1, which further comprises an antioxidant, a hindered phenol, a hindered amine or mixtures thereof.

19. The composition according to claim 1, which further comprises an antistatic agent, a lubricant, an inorganic filler, a pigment or mixtures thereof.

* * * * *